UNITED STATES PATENT OFFICE.

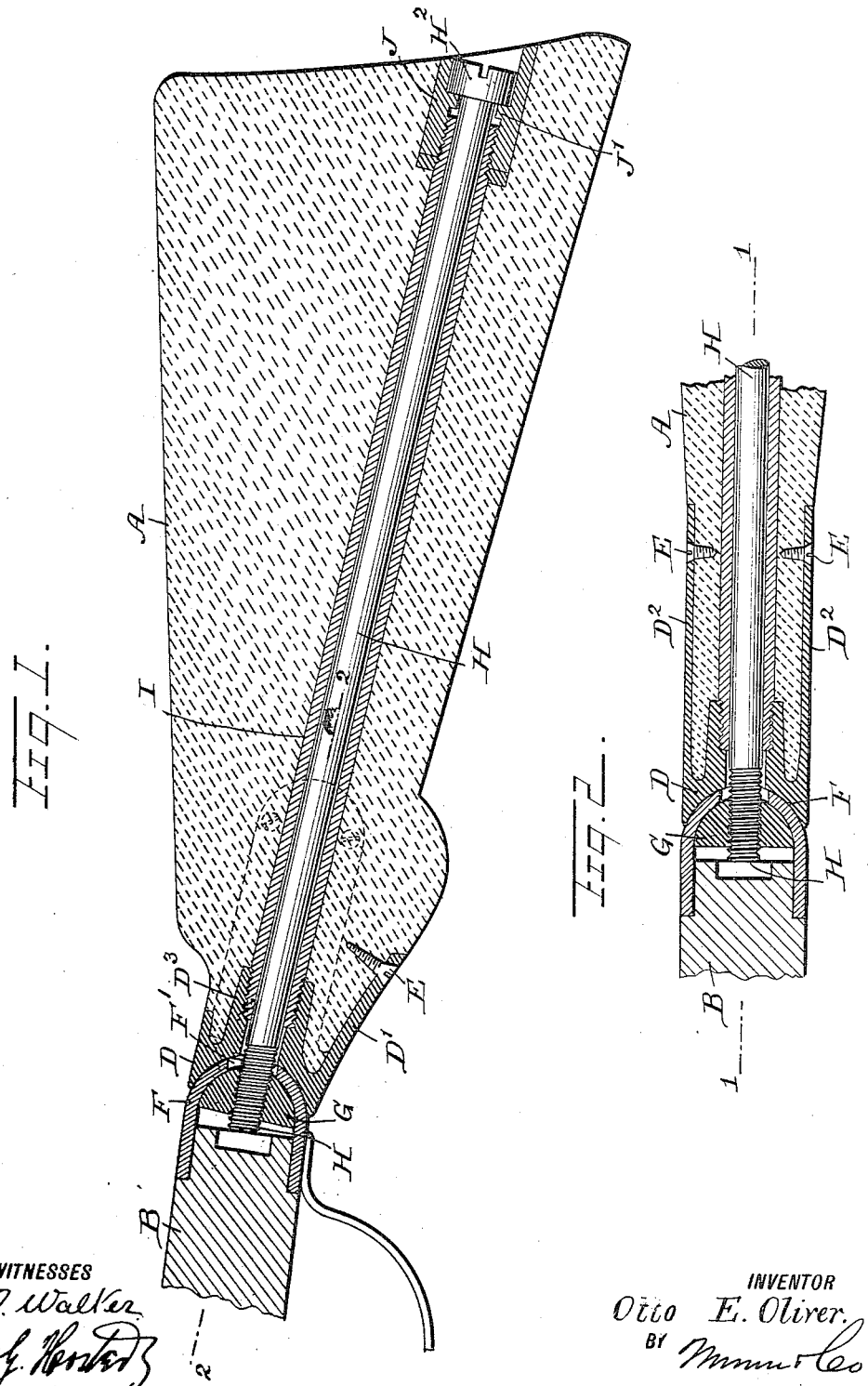

OTTO EDWARD OLIVER, OF MOUNT EDEN, CALIFORNIA.

ADJUSTABLE STOCK FOR FIREARMS.

1,047,690.  Specification of Letters Patent. Patented Dec. 17, 1912.

Application filed July 26, 1912. Serial No. 711,676.

*To all whom it may concern:*

Be it known that I, OTTO E. OLIVER, a citizen of the United States, and a resident of Mount Eden, in the county of Alameda and State of California, have invented a new and Improved Adjustable Stock for Firearms, of which the following is a full, clear, and exact description.

My invention is an improvement in that class of gunstocks in which the butt section or stock is pivoted to the front section or grip, so that the two may be adjusted at different angles to each other.

The invention is embodied in the construction, arrangement, and combination of parts hereinafter described, and illustrated in the accompanying drawing, in which—

Figure 1 is a longitudinal vertical section through the pivoted adjustable stop, the section being on the line 1—1 of Fig. 2, and Fig. 2 is a sectional plan view of the same on the line 2—2 of Fig. 1.

The adjustable stock for firearms consists essentially of a butt section A, a grip or barrel section B and a universal joint connection C connecting the butt section A with the grip or barrel section B. The universal joint connection C is provided with a hemi-spherical socket D having rearwardly-extending bottom and side flanges D' and D² let into the butt section A and fastened thereto by screws E to securely hold the socket D in position on the forward end of the butt section A. Into the socket D fits a hemispherical socket F fastened in position on the rear end of the grip or barrel section B, and into the member F fits a hemispherical nut G which screws on the threaded forward end of a screw rod H extending rearwardly through an elongated opening F' formed centrally in the forward socket F. The bolt extends through a tube or a sleeve I fitting lengthwise in the butt section A and screwing at its forward end into a rearward threaded extension D³ forming an integral part of the socket D. The rear end of the tube I screws into a bearing J provided with an annular seat J' on which is seated the head H² of the screw rod H, it being understood that the said head H² is readily accessible at the rear end of the butt section A to permit of turning the said screw rod H by the use of a screw driver, wrench or other tool, so that the screw rod H can be loosened to allow of turning the butt section A up or down or sidewise into the desired position, and permit rotation of the screw rod H to fasten the parts securely together, the hemispherical nut G in such case clamping firmly upon the hollow front socket F by which the latter is clamped between the sockets D and F.

By the arrangement described the butt section A can be adjusted up or down to suit a long or short-necked gunner or sportsman, or it can be adjusted sidewise to the right or left to suit a wide or narrow-shouldered man or a right or left-handed gunner, as the case may be.

By the construction and combination of parts described, I form a joint distinguished by simplicity, lightness, strength, and rigidity. Space is saved in the grip section of the stock by employing the hemispherical nut G, thus avoiding undue weakening of the grip and enabling it to be smaller than would be otherwise practicable. The use of the tube H also stiffens the stock and enables the rear hemispherical socket D to be held clamped firmly against the stock at all times.

Having thus described my invention, I claim as new and desire to secure by Letters Patent:

1. An adjustable stock for small firearms, comprising a butt section, a grip section, a hollow hemispherical front socket secured to the grip section and provided with a central opening in its rounded end, a rear hemispherical socket attached to the butt section and fitting upon the front socket, a hemispherical clamping nut fitted into the front hemispherical socket, and a bolt arranged lengthwise in the stock and screwing into said nut, as described.

2. An adjustable stock for small firearms, comprising a butt section, a grip section, a hollow hemispherical front socket secured to said grip section and provided with a central opening, a hemispherical rear socket attached to the butt section and into which the front hemispherical socket fits, a tube extending lengthwise through the butt section and screwing at its forward end into the rear socket, a bearing fitted into the rear end of the stock and screwing on the rear end of said tube, a hemispherical clamping nut fitting into the front hemispherical socket, and a screw bolt passing through the aforesaid tube, its forward end screwing into the hemispherical nut and its head seated upon the rear bearing, as described.

In testimony whereof I have signed my name to this application in the presence of two subscribing witnesses.

OTTO EDWARD OLIVER.

Witnesses:
T. A. NELSON,
O. S. JOHNSON.